United States Patent [19]
Calle

[11] Patent Number: 4,823,262
[45] Date of Patent: Apr. 18, 1989

[54] APPARATUS FOR DYNAMICALLY SWITCHING THE CLOCK SOURCE OF A DATA PROCESSING SYSTEM

[75] Inventor: Jaime Calle, Glendale, Ariz.

[73] Assignee: Honeywell Bull Inc., Phoenix, Ariz.

[21] Appl. No.: 66,689

[22] Filed: Jun. 26, 1987

[51] Int. Cl.⁴ .......................... G06F 15/16; G06F 9/00
[52] U.S. Cl. ..................................... 364/200; 364/131
[58] Field of Search ................ 364/200, 900, 131, 133

[56] References Cited

U.S. PATENT DOCUMENTS

| | | | |
|---|---|---|---|
| 4,354,229 | 10/1982 | Davis et al. | 364/200 |
| 4,468,734 | 8/1984 | Lanier et al. | 364/200 |
| 4,677,433 | 6/1987 | Catlin et al. | 364/131 X |
| 4,703,421 | 10/1987 | Abrant et al. | 364/200 |
| 4,709,347 | 4/1987 | Kirk | 364/900 |

*Primary Examiner*—Felix D. Gruber
*Attorney, Agent, or Firm*—Phillips J. H.; J. S. Solakian

[57] ABSTRACT

A data processing system includes a first and a second central system wherein the central processing unit (CPU) of the first central system is operatively connected to the system control unit (SCU) of the second central system and the CPU of the second central system is operatively connected to the SCU of the first central system, each central system including a service processor and a timing subsystem for providing clocking signals. Each central system includes an apparatus for distributing the clocking signals such that each central system is clocked from predetermined ones of the clocking signals in response to control signals from the service processors. The apparatus permits the distribution of the clocking signals to be switched dynamically while the central systems are operating, the switching of the clocking signals being accomplished without affecting the operation of the central systems. The apparatus comprises a generating element for generating local clocking signals. A first logic element generates a stop signal at a predetermined time relative to the local clocking signals in response to predetermined ones of the control signals. A gating element conditionally outputs the local clocking signals in response to the stop signal. A selector which receives remote clocking signals from the timing subsystem of the other central system selectively outputs the local clocking signals or the remote clocking signals in response to the predetermined control signals, the control signals being modified during a time period that the stop signal is active, thereby permitting the selector to select alternate clocking signals before the stop signal becomes inactive thereby switching the source of the clocking signals which are clocking the central systems without perturbing the tasks being executed in the central systems.

5 Claims, 5 Drawing Sheets

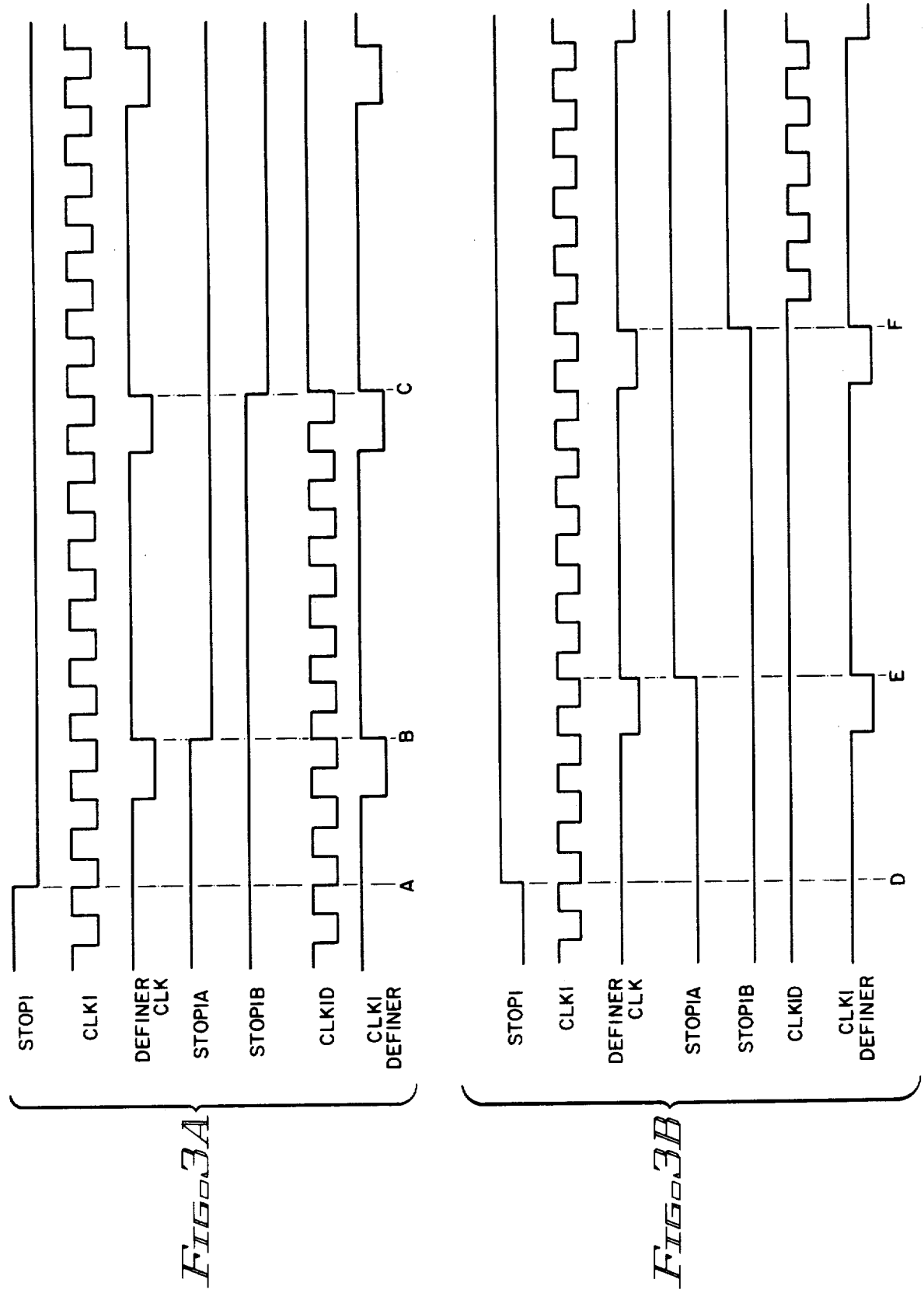

APPARATUS FOR DYNAMICALLY SWITCHING THE CLOCK SOURCE OF A DATA PROCESSING SYSTEM

BACKGROUND OF THE INVENTION

This invention relates to a digital data processing system, and more particularly, to an apparatus for dynamically switching the clock source of a computer system without causing the computer system to experience any malfunction or error in its currently operating task, i.e., without interrupting the data processing system.

In current data processing systems which include more than one central system, each central system has a clock or timing subsystem, the clock of each central system providing the clocking signals (or timing signals) to the subsystems associated with its central system. When it is necessary or desirous to have the two central systems synchronized, the timing signals of the two central systems are synchronized by utilizing a phase locked-loop circuit. In this manner, the equipments or subsystems of each central system are operating from synchronized clocks.

In the present invention each central system has a corresponding timing subsystem; however, the clocking signal generated from one of the timing subsystems provides the clocking signal for both central systems. If it is desirous or necessary to switch the source of the clocking signal from the timing subsystem of the currently active timing subsystem to the currently passive timing subsystem, the apparatus of the present invention will permit the switching of the clocking signals source to occur without interrupting the running of the subsystems of the central systems.

SUMMARY OF THE INVENTION

Therefore, there is supplied, an apparatus for accomplishing the switching of the clock source. A data processing system of the preferred embodiment includes a first and a second central system (CS), each central system having a central processing unit (CPU), a system control unit (SCU), and a memory unit and an input/output (I/O) unit operatively connected to the SCU. Further, the CPU of the first central system is operatively connected to the SCU of the second central system and the CPU of the second central system is operatively connected to the SCU of the first central system. Each central system includes a service processor and a timing subsystem for providing clocking signals. Each central system further includes an apparatus for distributing the clocking signals such that each central system is clocked from predetermined ones of the clocking signals in response to control signals from the service processors. Further, the distribution of the clocking signals can be switched dynamically while the central systems are operating, the switching of the clocking signals being accomplished without affecting the operation of the central systems. The apparatus comprises a generating element for generating local clocking signals. A first logic element generates a stop signal at a predetermined time relative to the local clocking signals in response to predetermined ones of the control signals. A gating element, operatively connected to the first logic element and to the generating element, conditionally outputs the local clocking signals in response to the stop signals. A selector, having an input terminal adapted to receive remote clocking signals from the timing subsystem of the other central system, the selector operatively connected to the gating element selectively outputs the local clocking signals or the remote clocking signals in response to the predetermined control signals, the control signals being modified during a time period that the stop signal is active, thereby permitting the selector to select alternate clocking signals before the stop signal becomes inactive thereby switching the source of the clocking signals which are clocking the central systems without perturbing the tasks being executed in the central systems.

Accordingly, it is an object of the present invention to provide an apparatus for switching the source of clocking signals to a central system.

It is another object of the present invention to provide an apparatus for switching the source of clocking signals to a central system without affecting the running of the equipments of the central system.

It is still another object of the present invention to provide an apparatus for switching the source of clocking signals to a central system such that, once the switching of the source of the clocking signals has been switched, the central systems can continue to execute the tasks which were being executed without any errors or malfunctions.

These and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 3A shows a timing diagram of the various control and clocking signals of the preferred embodiment of the present invention in order to stop the running (or execution) of the equipments (or subsystems) of the central systems;

FIG. 3B shows a timing diagram of the various control and clocking signals of the preferred embodiment of the present invention in order to start the running of the equipments of the central systems once the source of the clocking signals has been switched;

DETAILED DESCRIPTION

Figure 1:
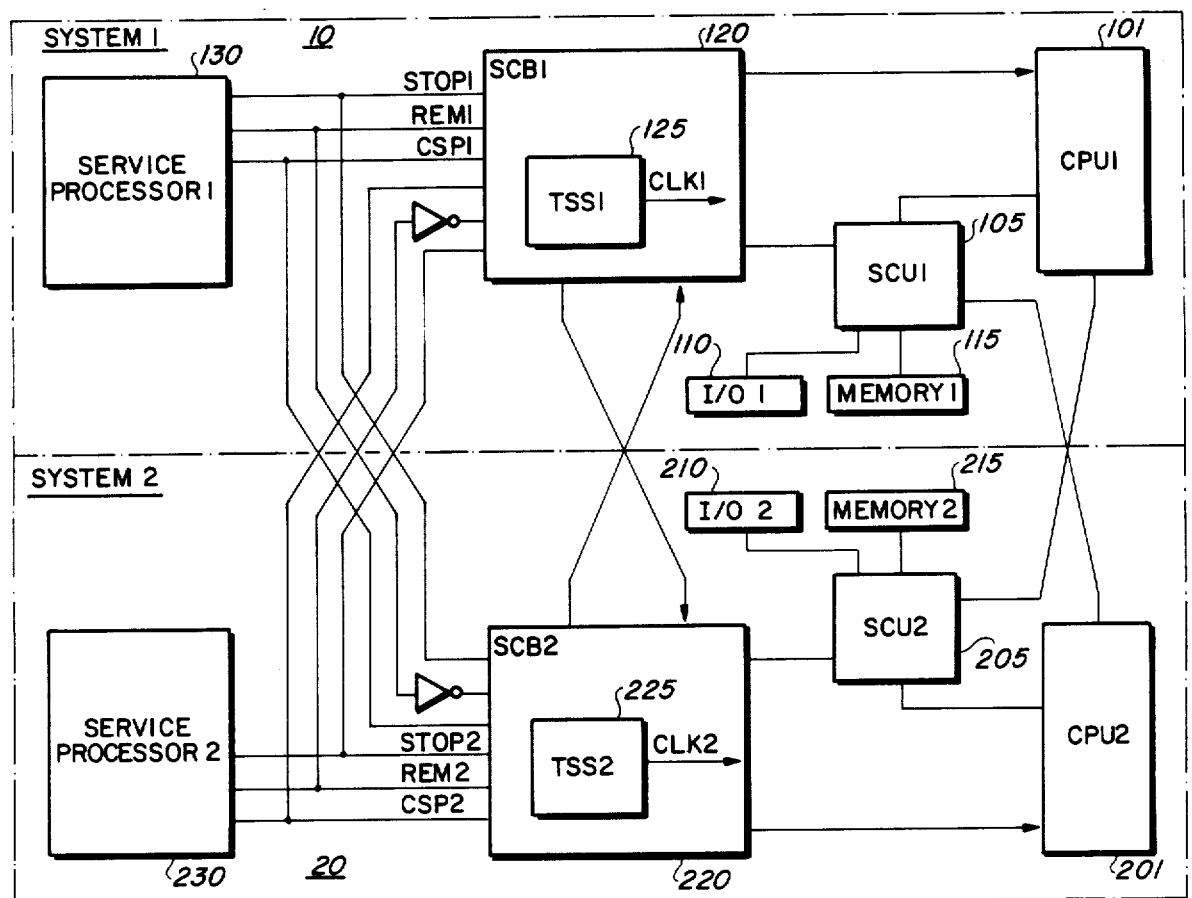
FIG. 1 shows a data processing system which includes a plurality of central systems in which the apparatus of the present invention may be utilized.

Referring to FIG. 1, there is shown a data processing system which comprises system1 10 and system2 20. System1 (also referred to herein as central system1), comprises a central processing unit (CPU1) 101. Likewise, system2 (also denoted herein as central system2) includes a CPU2 201. Operatively connected to CPU1 101 is a system control unit (SCU 1) 105 for interfacing the CPU1 101 to an input/output unit (I/O1) 110 and a memory unit (memory1) 115. In a similar manner, CPU2 201 of central system 2 is operatively connected to a SCU2 205 for interfacing the CPU2 to I/O2 210 and a memory unit (memory2) 215. In the data processing system of the preferred embodiment, CPU1 101 is operatively connected to SCU2 205 thereby permitting access to I/02 210 and memory2 215 by CPU1 101. Similarly, CPU2 201 is operatively connected to SCU1 105 thereby permitting CPU2 201 access to I/01 110 and memory1 115. Central system1 10 includes a system control board (SCB1) 120, and central system2 20 includes an SCB2 220. SCB1 120 includes the timing subsystem (TSS1) 125 and generates clocking signals, a basic clocking signal being denoted as CLK1. Likewise, SCB2 220 includes a timing subsystem (TSS2) for providing clocking signals denoted as CLK2. The clocking signals of the timing subsystems 125, 225 are cross coupled between SCB1 120 and SCB2 220. The SCB1 120 is operatively connected to the equipments of central system1 (CPU1 101, SCU1 105) for providing the clocking signals to the equipments (or subsystems). Similarly, SCB2 is operatively connected to the equipments of central system2 (CPU2 201, SCU2 205) for providing the clocking signals thereto. Each central system includes a service processor 130, 230. Service processor1 130 (also denoted herein as SP1) provides control signals (STOP1, REM1, and CSP1) to both SCB1 120 and SCB2 220. Likewise, service processor2 230 (also denoted herein as SP2) provides control signals (STOP2, REM2, and CSP2) to both SCBs 120, 220. The REM signal (REMOTE) is inverted when it is coupled to the SCB of the other central system as will be described in further detail hereinunder. The service processor is a microcomputer system for providing maintenance and support functions for the central system subsystems, and can be of the type as described in U.S. Pat. No. 4,581,738 entitled "Test and Maintenance Method and Apparatus for a Data Processing System", U.S. Pat. No. 4,567,593 entitled "Apparatus for Verification of a Signal Transfer in a Preselected Path in a Data Processing System", and U.S. Pat. No. 4,625,312 entitled "Test and Maintenance Method and Apparatus for Investigation of Intermittent Faults in a Data Processing System", all patents assigned to Honeywell Bull Inc., (formerly known as Honeywell Information Systems Inc.), the same assignee as the present application.

Figure 2:
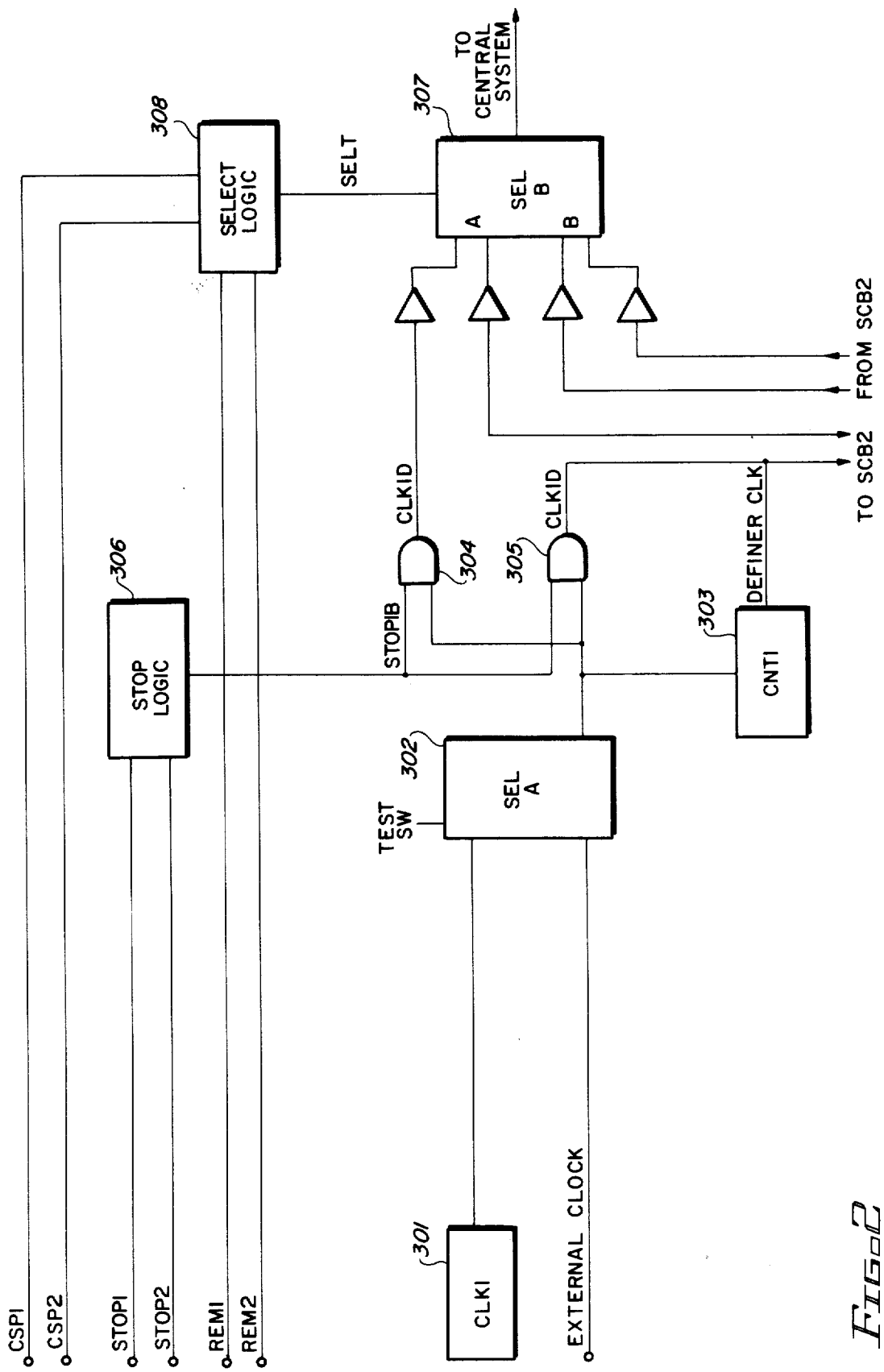
FIG. 2 shows a functional block diagram of a timing subsystem of the central system of FIG. 1.

Referring to FIG. 2, there is shown a functional block diagram of the timing subsystem (TSS) 125 of the SCB1 120. The timing subsystem 225 for system2 will be functionally identical to that of FIG. 2; however, the clock generating circuit of TSS2 225 will generate an output clocking signal denoted CLK2 as mentioned above in conjunction with FIG. 1. Further, the control signals CSP, STOP, and REM will also be inputted to TSS2 225 as discussed above in conjunction with FIG. 1.

The TSS 125 of FIG. 2 includes a clocking signal generation circuit (or clock generation circuit) 301 that outputs a clocking signal denoted as CLK1. A first selector (SELA) 302 is included in the preferred embodiment of the present invention to allow for inputting an external clocking signal to the central system, but will be recognized by those skilled in the art that the selector is not essential in order to capture the true scope and spirit of the present invention. SELA 302 has a second input from the clock generation circuit 301 and includes a test switch (TEST SW) in order to permit an operator to select between the normal clocking signals of the timing subsystem 125 or to select the clocking signals from an external clock source (not shown). The output of the first selector 302 is coupled to a counting circuit (CNT1) 303 for generating a definer clocking signal (DEFINER CLK). The counting circuit 303 of the preferred embodiment is a self-clearing shift register well known to those skilled in the art.

The output of the first selector 302 is operatively connected to a first and second AND gate 304, 305 thereby coupling the clocking signal CLK1 into a first input of each AND gate. Also included in the timing subsystem 125 is stop logic 306 which outputs a control signal STOP1B in response to the stop control signals from the service processors 130, 230, the operation of the stop logic to be discussed hereinunder. Normally, the signal STOP1B is at a state which qualifies AND gates 304, 305 such that each AND gate outputs the clocking signal generated by the clock generation circuit 301, the output of the AND gates being denoted as CLK1D. The clocking signal CLK1D is operatively connected from first AND gate 304 to an A input-terminal of a second selector (SELB) 307. Also coupled to an A terminal of SELB 307 is the definer clocking signal (DEFINER CLK) generated by the counting circuit 303. The output of second AND gate 305 is operatively connected to the other (or remote) SCB, in this case to SCB2 220. The definer clocking signal of TSS1 125 is also coupled to the other (or remote) SCB, i.e., SCB2 225. The clocking signal CLK2D (the corresponding signal to CLK1D but originating from TSS2 225) is received by SCB1 120 and operatively coupled to a B terminal of second selector 307. Also the definer clocking signal generated by SCB2 220 is also operatively coupled to a B terminal of SELB 307. Select logic 308 generates a select signal (SELT) which selects the A terminals or the B terminals, i.e., the clocking signals generated by the local board (i.e., CLK1), or the clocking signals generated by the remote timing subsystem 225 of SCB2 220, respectively. The selection is accomplished by the select signal (SELT) from the select logic 308. This select signal is generated in response to the remote signals (REM1, REM2) and the control signals (CSP1, CSP2) from the service processors 130, 230, and will be discussed further hereinunder.

FIG. 3A shows the timing of the various control and clocking signals of the preferred embodiment of the present invention in order to achieve the stopping of the running of the equipments of the central systems. FIG. 3B shows the timing of the various control and clocking signals in order to achieve the starting of the running of the equipments of the central systems, thereby enabling the source of the clocking signals to switch without impacting the running of the equipments of the central systems, i.e., causing an error or glitch to occur in a processing task once the central system is started. FIGS. 3A and 3B show the control signals STOP1 associated with service processor 1 and the clocking signal CLK1 from the timing subsystem 1 of SCB1 120. (It will be understood that the timing subsystem2 of SCB2 is also operating and generating the respective clocking signal CLK2.) At a point in time, A, the STOP1 signal goes low indicating that the central systems are to stop executing. The stop signal can occur at any time asynchronously to the clocking signal CLK1 or the definer clock. At point B, as a function of the internal definer clock, a stop signal STOP1A is generated internal to stop logic 306. One internal definer clock time later the stop logic 306 generates a second signal STOP1B which is coupled to AND gate 304 disabling the AND gate 304 and stopping the clocking signal CLK1D from being transmitted to the second selector 307. Similarly, AND gate 305 is disabled thereby inhibiting the transmission of the CLK1 clocking signal to the remote SCB, i.e., to SCB2 220. In the preferred embodiment of the present invention the STOP1 signal would remain low for a predetermined period of time.

Referring to FIG. 3B, the starting of the clock signal transmissions to the equipments of the central system will now be described. Upon the completion of the predetermined (or fixed) time that the stop signal remains low, the stop signal would then go high, point D. At this point the remote signals REM and/or the control signals CSP would change in accordance with a predetermined input to the service processor(s). At point E, the positive slope of the internal definer clock, the internal stop control signal STOP1A goes high, and one internal definer clock time later the stop signal STOP1B would also go high, at point F, thereby enabling the AND gates 304, 305. At this point in time the clock signals CLK1D and the associated definer clock would be transmitted to SCB2 220 from the SCB1 120; likewise, at a time point F corresponding to the timing subsystem 2 of SCB2, which is not the same as time point F for the timing subsystem 1 of SCB1, the corresponding clocking signal CLK2D and the associated definer clock would be transmitted from SCB2 220 to SCB1 120. The selector signal from the select logic 308 will have selected input terminals A or input terminals B as a result of the REM and SCP control signals. If the select signal generated by the select logic 308 formerly selected input terminals A, but as a result of the operation described above the REM and CSP control signal are modified such that the select signal now selects input terminal B, the source of the clocking signal is changed such that the clocking signals to central system 1 would now be from the timing subsystem2 225. By causing the clocking signals to stop at a predetermined time, the operation of the equipment of the central system pause momentarily while the clocking source is switched, and once started again starts at a predetermined time such that the operation of the equipment of the central system can proceed without causing any error.

The select signal generated by the select logic 308 is generated in response to the control signals of the service processors 130, 230 and is tabulated in Table 1.

TABLE 1

| Local Port | | Remote Port | | Output Clock to |
|---|---|---|---|---|
| CSP | REM | CSP | REM | the Central System |
| 0 | 0 | 0 | X | LOCAL |
| 0 | 1 | 0 | X | REMOTE |
| 1 | 0 | X | X | LOCAL |
| 1 | 1 | X | X | REMOTE |
| 0 | X | 1 | 0 | LOCAL |
| 0 | X | 1 | 1 | REMOTE |

X = Don't Care

An examination of Table 1 indicates that central system 1 and central system 2 can operate as independent systems. Thus, if the control signals CSP1 equals a logic one (or hereafter simply denoted as a one) and CSP2 equals one, and REM1 equals zero, and REM2 equals zero, then SCB1 120 will select the local clock (i.e., CLK1) and SCB2 will also select the local clock (i.e., CLK2), the central systems thereby running independently of one another. If CSP1 equals one and CSP2 equals zero, then REM1 will control the selection of the clock source. If REM1 equals zero, then the local clock will be selected for SCP1 120 and because of the inversion of the REM1 signal coupled to SCP2 220 (as mentioned above) the remote REM signal to SCP2 will be a one causing SCP2 220 to select the remote clock, or clock 1. Thus, both central systems will be clocked from the same clocking signal CLK1. To select the clocking signals from TSS2 225 in accordance with the timing described above, at the appropriate time (i.e., point D) of FIG. 3B, switching the remote (REM1) signal from a logic zero to a logic one will achieve the switching of the clocking signal source.

Figure 4:
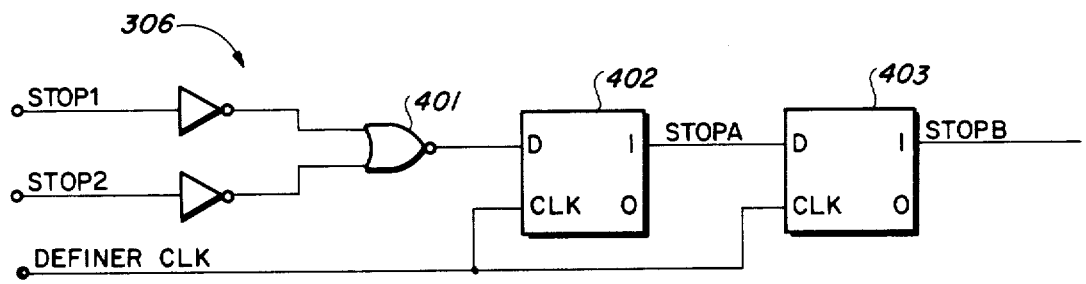
FIG. 4 shows a functional block diagram of the stop logic of the present invention.

Referring to FIG. 4, there is shown a functional block diagram of the stop logic 306. The stop control signals STOP1, STOP2 are inputted into the stop logic 306 and are ORd by OR gate 401. The output of the OR gate 401 is coupled to the D input of a first D-type flip flop 402 which is clocked by the local definer clock. The output of the first D-type flip flop 402 is the signal referred to above as STOP1A. The STOP1A input is then coupled to a second D-type flip flop 403 which is also clocked by the local definer clock, the output of the second D-type flip flop 403 being the signal referred to above as STOP1B. In this manner, and as has been described above, the clocking signals are stopped synchronously to the local definer clock.

Figure 5:
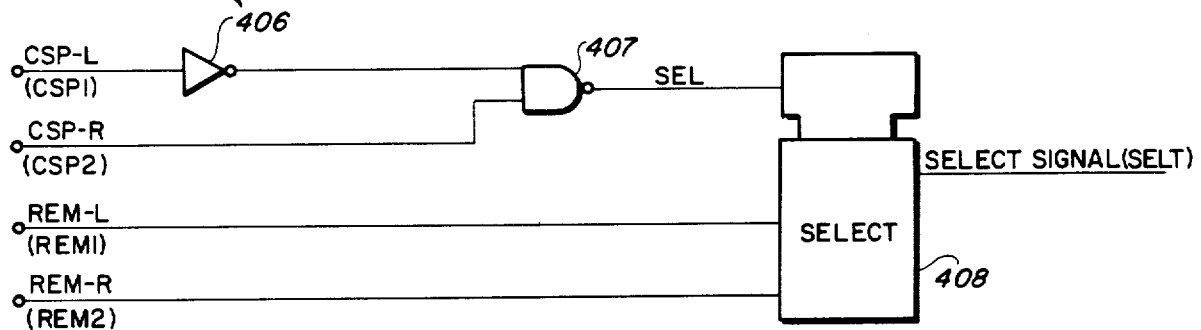
FIG. 5 shows a functional block diagram of the select logic of the present invention.

Referring to FIG. 5, there is shown a functional block diagram of the select logic 308. The inputs denoted as CSP-L and CSP-R are indicative of the CSP LOCAL and CSP REMOTE signals to the SCB 120, 220. In FIG. 5, the CSP-L is also denoted as CSP1 and CSP-R is denoted as CSP2 indicating that the logic shown in FIG. 5 is referring to the select logic 308 of the timing subsystem1 125. The select logic 308 for the timing subsystem of CSB2 225 operates in exactly the same way, however, the nomenclature for the local and remote signals will be reversed, i.e., CSP LOCAL will be CSP2 and CSP REMOTE will be CSP1 for timing subsystem2. The local and remote REM control signals are inputted to a selector 408 and the output of the selector 408 is the select signal (SELT) which is coupled to the second selector (SELB) 307. The selection of the remote signals is controlled by a control signal SEL which is generated by the logic 406, 407 and operates in accordance with Table 2.

TABLE 2

| CSP-L | CSP-R | SEL | Selected Input Signal |
|---|---|---|---|
| 0 | 0 | 1 | REM-L |
| 0 | 1 | 0 | REM-R |
| 1 | 0 | 1 | REM-L |
| 1 | 1 | 1 | REM-L |

The CSP control signals are inputted into this logic 406, 407 which controls which REM signal will be selected. Table 2 corresponds with the operation defined in Table 1 as discussed above.

Figure 6:
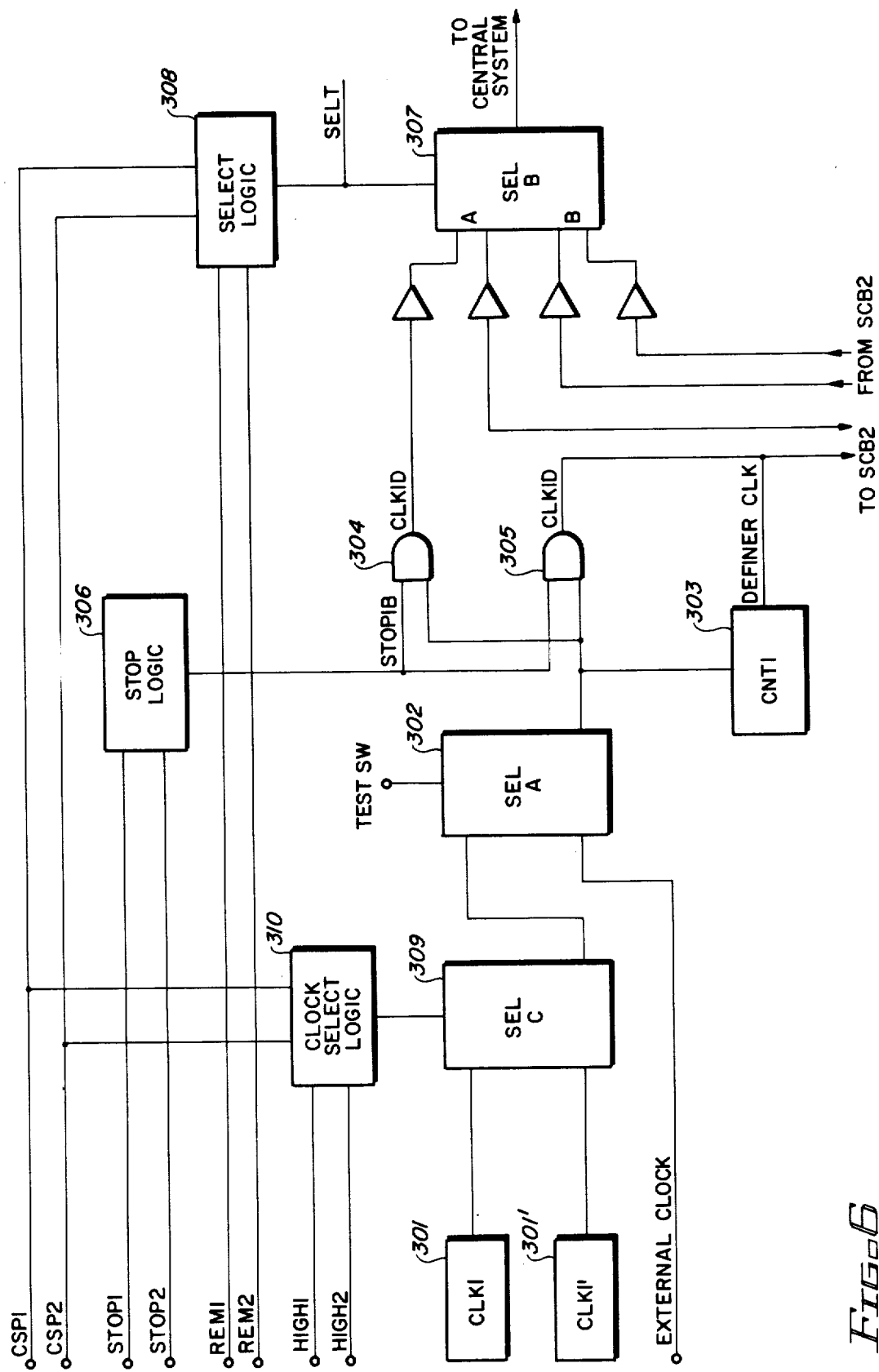
FIG. 6 shows a functional block diagram of an alternative embodiment of the present invention.

It will be understood that the frequencies of CLK1 and CLK2 may be of the same frequency or of different frequencies. In an alternative embodiment, the timing subsystem 125 may include a first and second clock of different frequencies. Referring to FIG. 6 there is shown a functional block diagram of the alternative embodiment of the present invention. Added to the timing subsystem is a second clock generator (CLK1') 301'. The input from the two clocking generators 301, 301' are coupled to a selector, SELC 309, having an output which is then coupled into the first selector SELA 302. From this point on the timing subsystem operates the same as has been described above in conjunction with FIG. 2. Also included in this alternative embodiment is the clock select logic 310 which determines which clock generating circuit 301, 301' is to be selected. The selection is done in response to newly added control signals HIGH1, HIGH2 which are coupled to the SCB from the service processors. In this case, HIGH1 corresponds to a local high control signal and HIGH2 corresponds to a remote high control signal, since as above, the discussion here relates to timing subsystem1. The nomenclature HIGH is indicative that one clock will have a higher frequency than the other clock. The clock selection between CLK1 and CLK1' operates similar to that described above and is tabulated in Table 3.

TABLE 3

| Local Port | | | Remote Port | | | Output |
|---|---|---|---|---|---|---|
| CSP | REM | HIGH | CSP | REM | HIGH | Clock (SS) |
| 0 | 0 | 0 | 0 | X | X | Local CLK1 |
| 0 | 0 | 1 | 0 | X | X | Local CLK1' |
| 0 | 1 | X | 0 | X | X | Remote |
| 1 | 0 | 0 | X | X | X | Local CLK1 |
| 1 | 0 | 1 | X | X | X | Local CLK1' |
| 1 | 1 | X | X | X | X | Remote |
| 0 | X | X | 1 | 0 | 0 | Local CLK1 |
| 0 | X | X | 1 | 0 | 1 | Local CLK1' |
| 0 | X | X | 1 | 1 | X | Remote |

While there has shown what is considered to be the preferred embodiment of the invention, it will be manifest that many changes and modifications can be made therein without departing from the essential spirit and scope of the invention. It is intended, therefore, in the annexed claims, to cover all such changes and modifications which fall within the true scope of the invention.

I claim:

1. In a data processing system which includes a first and a second central system (CS), each central system having a central processing unit (CPU), a system control unit (SCU), and a memory unit and an input/output (I/O) unit operatively connected to the SCU, and further wherein the CPU of the first central system is operatively connected to the SCU of the second central system and the CPU of the second central system is operatively connected to the SCU of the first central system, each central system including a service processor and a timing subsystem for providing clocking signals, each central system further including an apparatus for distributing the clocking signals such that each central system is clocked from predetermined ones of said clocking signals in response to control signals from said service processors, and further wherein the distribution of the clocking signals can be switched dynamically while the central systems are operating, the switching of the clocking signals being accomplished without affecting the operation of the central systems, said apparatus comprising:

(a) generating means, for generating local clocking signals;

(b) first logic means, for generating a stop signal at a predetermined time relative to said local clocking signals in response to predetermined ones of said control signals;

(c) gating means, operatively connected to said first logic means and to said generating means, for conditionally outputting said local clocking signals, in response to said stop signal; and (d) select means, having an input terminal adapted to receive remote clocking signals from the timing subsystem of the other central system, the select means operatively connected to said gating means, for selectively outputting said local clocking signals or said remote clocking signals in response to said predetermined control signals, the control signals being modified during a time period that the stop signal is active, thereby permitting the select means to select alternate clocking signals before the stop signal becomes inactive thereby switching the source of the clocking signals which are clocking the central systems without perturbing the tasks being executed in said central systems.

2. An apparatus for distributing the clocking signals according to claim 1, wherein said generating means comprises:

(a) source means for generating a basic timing signal; and (b) counter means, operatively connected to said source means, for generating a definer timing signal from the basic timing signal, said basic timing signal and said definer timing signal being included among said local clocking signals.

3. An apparatus for distributing the clocking signals according to claim 2, wherein said generating means further comprises:

first selector means, having a first and second input terminal, and an output terminal operatively connected to said gating means, the first input terminal adapted to receive predetermined ones of said local clocking signal and said second input terminal adapted to receive clocking signals from an externally supplied clocking source, for coupling the local clocking signal or the clocking signals from the externally supplied clocking source to the output terminal in response to a clock source select signal.

4. An apparatus for distributing the clocking signals according to claim 3, wherein said select means comprises:

(a) select logic means, having an input terminal adapted to receive the predetermined control signals, for generating a select signal such that said select signal can be modified during a time period that the CPUs of the CSs are stopped, the stopping of the CPUs being caused by stopping the clocking signals being delivered to the CPUs at a predetermined time, the select signal being generated in response to predetermined control signals; and (b) second selector means, having a first and second input terminal and an output terminal, the first input terminal operatively connected to said gating means for receiving the local clocking signals, the second input terminal adapted to receive the remote clocking signals from the timing subsystem of the other central system, for selectively coupling the selected clocking signals to the control system in response to the select signal.

5. In a data processing system which includes a first and a second central system (CS), each central system having a central processing unit (CPU), a system control unit (SCU), and a memory unit and an input/output (I/O) unit operatively connected to the SCU, and further wherein the CPU of the first central system is operatively connected to the SCU of the second central system and the CPU of the second central system is operatively connected to the SCU of the first central system, each central system including a service processor and a timing subsystem for providing clocking signals, each central system further including an apparatus for distributing the clocking signals such that each central system is clocked from predetermined ones of said clocking signals in response to control signals from said service processors, and further wherein the distribution of the clocking signals can be switched dynamically while the central systems are operating, the switching of the clocking signals being accomplished without affecting the operation of the central systems, said apparatus comprising:

(a) generating means, for generating a plurality of sets of local clocking signals;

(b) first select means, operatively connected to said generating means, for selectively outputting one of the plurality of sets of local clocking signals in response to said predetermined control signals;

(c) first logic means, for generating a stop signal at a predetermined time relative to said local clocking signals in response to predetermined ones of said control signals;

(d) gating means, operatively connected to said first logic means and to said first select means, for conditionally outputting said selected local clocking signals, in response to said stop signal; and (e) second select means, having an input terminal adapted to receive remote clocking signals from the timing subsystem of the other central system, the second select means operatively connected to said gating means, for selectively outputting said selected local clocking signals or said remote clocking signals in response to said predetermined control signals, the control signals being modified during a time period that the stop signal is active, thereby permitting the select means to select alternate clocking signals from the generating means or from the other central system before the stop signal becomes inactive thereby switching the source of the clocking signals which are clocking the central systems without perturbing the tasks being executed in said central systems.

* * * * *